United States Patent

Bansemir et al.

[11] Patent Number: 6,004,099
[45] Date of Patent: Dec. 21, 1999

[54] ROTOR BLADE CONNECTION

[75] Inventors: Horst Bansemir; Gerhard Hausmann, both of München, Germany

[73] Assignee: Daimler-Benz Aerospace AG, Germany

[21] Appl. No.: 08/861,199

[22] Filed: May 21, 1997

[30] Foreign Application Priority Data

May 21, 1997 [DE] Germany .......................... 196 20 427

[51] Int. Cl.$^6$ .................................................. B64C 27/51
[52] U.S. Cl. .............................................. 416/31; 416/230
[58] Field of Search ................................ 416/31, 134 A, 416/230, 239

[56] References Cited

U.S. PATENT DOCUMENTS

| | | | |
|---|---|---|---|
| 3,261,407 | 7/1966 | Culver et al. | 416/134 A X |
| 4,037,988 | 7/1977 | Laird . | |
| 4,334,825 | 6/1982 | Braun et al. | 416/134 A |
| 4,352,631 | 10/1982 | Buchs et al. | 416/134 A |
| 4,519,743 | 5/1985 | Ham | 416/31 X |
| 4,650,401 | 3/1987 | Yao et al. | 416/134 A |
| 4,892,461 | 1/1990 | Matsumoto et al. | 416/134 A |
| 4,898,515 | 2/1990 | Beno et al. | 416/134 A |
| 5,224,826 | 7/1993 | Hall et al. | 416/4 |
| 5,358,381 | 10/1994 | Covington et al. | 416/134 A |
| 5,431,538 | 7/1995 | Schmaling et al. | 416/134 A |
| 5,489,193 | 2/1996 | Levallard | 416/134 A X |
| 5,655,878 | 8/1997 | Yamakawa et al. | 416/31 |
| 5,690,474 | 11/1997 | Byrnes et al. | 416/134 A |

FOREIGN PATENT DOCUMENTS 2917301  10/1980  Germany ........................... 416/134 A

*Primary Examiner*—John E. Ryznic
*Attorney, Agent, or Firm*—Evenson, McKeown, Edwards & Lenahan, P.L.L.C.

[57] ABSTRACT

The helicopter rotor blade connection has a support beam which connects the lift-generating wing section of the rotor blade with the rotor hub, and transmits centrifugal and lateral forces as well as bending and torsional moments. The connection is torsionally elastic and, at least in a main plane, bending elastic. A damping device for damping bending vibrations of the support beam is constructed alternately of elastomer layers and intermediate layers which are stiff in the direction of their extension. According to the invention, the damping device consists of a plurality of separate individual dampers which are arranged with their elastomer and intermediate layers in the direction of the main bending plane of the support beam. The individual dampers are in each case integrated in the support beam structure in slots extending from the exterior edge into the support beam interior essentially in parallel to one another, while the two exterior elastomer layers of each individual damper are coextensively bound to the adjoining support beam sections.

10 Claims, 2 Drawing Sheets

ROTOR BLADE CONNECTION

This application claims the priority of German priority documnent 196 20 427.5, the disclosure of which is expressly incorporated by reference herein.

BACKGROUND AND SUMMARY OF THE INVENTION

The invention relates to a connection between the rotor blade and rotor hub of a helicopter.

Helicopters having a rotor blade connection without joints and bearings normally contain a support beam (also called "flex beam") arranged between the lift-generating wing section and the rotor hub. The flex beam must securely transmit not only centrifugal and lateral forces, but also bending and torsional moments from the blade root to the rotor hub. Hence, it must simultaneously be constructed to be bending elastic about two axes, specifically usually flap-elastic in an area relatively nearer to the hub and lead-lag elastic in an area relatively nearer to the wing. Finally, it must also be as torsionally soft for permitting the blade angle adjusting movements about the longitudinal axis.

Vibrations in such a support beam are damped by means of an elastomer damper, which is either provided as a separate constructional unit between the rotor hub and the support beam or, as disclosed in German patent document DE 25 58 709 and German Patent Document DE 27 58 086, is applied in the manner of a surface-side coating directly to the support beam. However, in this case, it is difficult to connect a damper with a sufficiently large elastomer volume to the support beam structure in such a fashion that the individual elastomer layers are shear deformed as uniformly as possible under the effect of the rotational lead-lag movements of the rotor blades, as required in order to achieve an effective damping of the partially very small lead-lag bending-deformations of the support beam.

It is an object of the present invention to provide a rotor blade connection of the type mentioned above, in which the damping device is easily installed, and which achieves high-level structural damping with a large elastomer volume on a limited support beam length, without impairing the required stability and stiffness behavior of the support beam.

This object is achieved by the rotor blade connection, according to the invention, in which the damping device is arranged in slot-shaped notches of the support beam (which are required anyhow, to provide the necessary elasticity of torsion). This arrangement provides a space-saving housing of a large elastomer volume in the support beam structure itself. Because of such division into a plurality of slots and individual dampers extending in the direction of the main bending plane of the support beam, this arrangement ensures an extremely homogeneous or uniform shear deformation and a large-surface linking of the individual elastomer layers directly to the bending-deformed support beam sections. As a result both a high-level damping effect and a long useful life of the elastomer damper are achieved.

In another advantageous embodiment of the invention, intermediate layers of the individual dampers are each fixed to the support beam structure by singular fastening points, thereby preventing unintended relative displacements between the support beam structure and the intermediate layers, as well as disturbing shear distortions of the elastomer layers (for example, under centrifugal force). The damping effect of the individual elastomer dampers, however, is fully maintained.

Although the support beam slots and individual dampers may extend continuously along the whole bending-elastic support beam area, it is advantageous to divide the support beam slots in the longitudinal direction of the beam, and to arrange an individual damper in each partial slot in order to sensitively mutually coordinate the strength, stiffness and damping behavior of the support beam.

In another, particularly preferred, embodiment of the invention, the surface dimensions of the intermediate layers can be controlled electrically so that the shear deformation of the elastomer layers does not depend solely on the extent of the bending deformation of the support beam, but can also be influenced by external controls. As a result, the damping effect can be significantly improved mainly in the range of small bending vibrations of the support beam. To achieve a structurally simple control of the surface dimensions of the intermediate layers, these are preferably covered by electrically controlled piezo elements. Generally such piezo coatings can be used in connection with elastomer dampers only to a limited extent because of their high bending sensitivity; according to the invention, however, as a result of their special positioning, they are (like the intermediate layers) exposed to only very slight bending deformation and can therefore be used without any problems for controlling the damping effect. In order to provide an automatic control with desired control characteristics, the support beam is preferably equipped with a sensor arrangement for detecting bending vibrations of the support beam, and a control unit which activates the piezo elements according to the sensor signals.

As mentioned above, in the case of a helicopter rotor blade connection, mainly lead-lag bending vibrations of the support beam must be dampened. Correspondingly, the individual elastomer dampers are expediently arranged in the direction of the bending plane of the lead-lag elastic support beam section.

The support beam and/or the intermediate layers may be made of metal or preferably of a fiber reinforced material, in order to achieve favorable stiffness and stability behavior.

Other objects, advantages and novel features of the present invention will become apparent from the following detailed description of the invention when considered in conjunction with the accompanying drawings.

BRIEF DESCRIPTION OF THE DRAWINGS

FIG. 1A is a schematic top view of a blade connection for a helicopter rotor blade;

DETAILED DESCRIPTION OF THE DRAWINGS

The blade connection illustrated in the figures, for a helicopter rotor without joints and bearings, contains a support beam 6 made of a fiber reinforced material and arranged between a lift-generating wing section 2 and the rotor hub 4. The support beam 6 must securely transmit the centrifugal and lateral forces as well as bending moments and torsional moments from the blade root to the rotor hub 4 and must simultaneously form the fictitious flap and lead-lag joint and blade angle bearing.

Figure 1B:
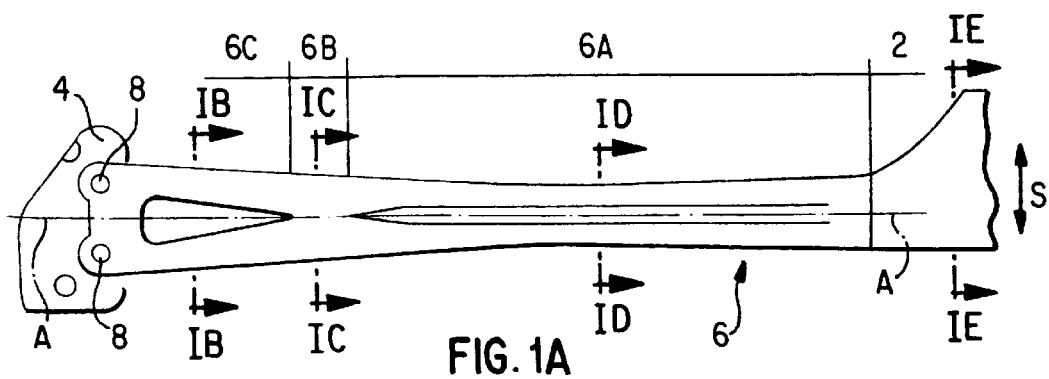
FIGS. 1B–1E are cross-sectional views of the blade connection of FIG. 1A, taken along section lines IB—IB through IE—IE respectively.
Figure 1B:
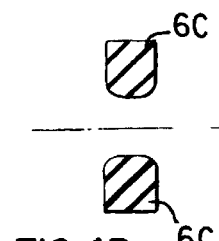
Figure 1C:
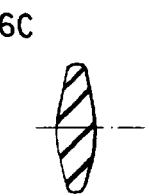
Figure 1D:
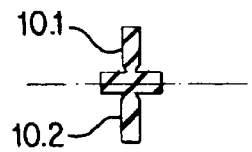
Figure 1E:
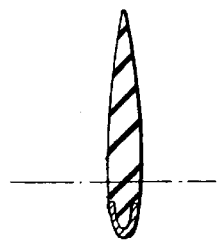

For this purpose, the support beam 6 consists of a first beam section 6A which adjoins the wing section 2 (FIG. 1E) and has a cross-shaped cross-section (FIG. 1D) which is relatively elastic with respect to bending in the lead-lag direction S but is comparatively resistant to bending in the flapping direction R (perpendicular to the plane of FIG. 1E). A second beam section 6B adjoins the lead-lag elastic beam section 6A on the hub side and has a cross-sectional profile (FIG. 1C) which is relatively resistant to lead-lag bending but is elastic with respect to bending in the flapping direction R. The second beam section 6B changes into a double loop 6C (in FIG. 1B) in the direction of the hub 4, by means of which the support beam 6 is connected to the rotor hub 4 via connecting pins 8.

Figure 2:
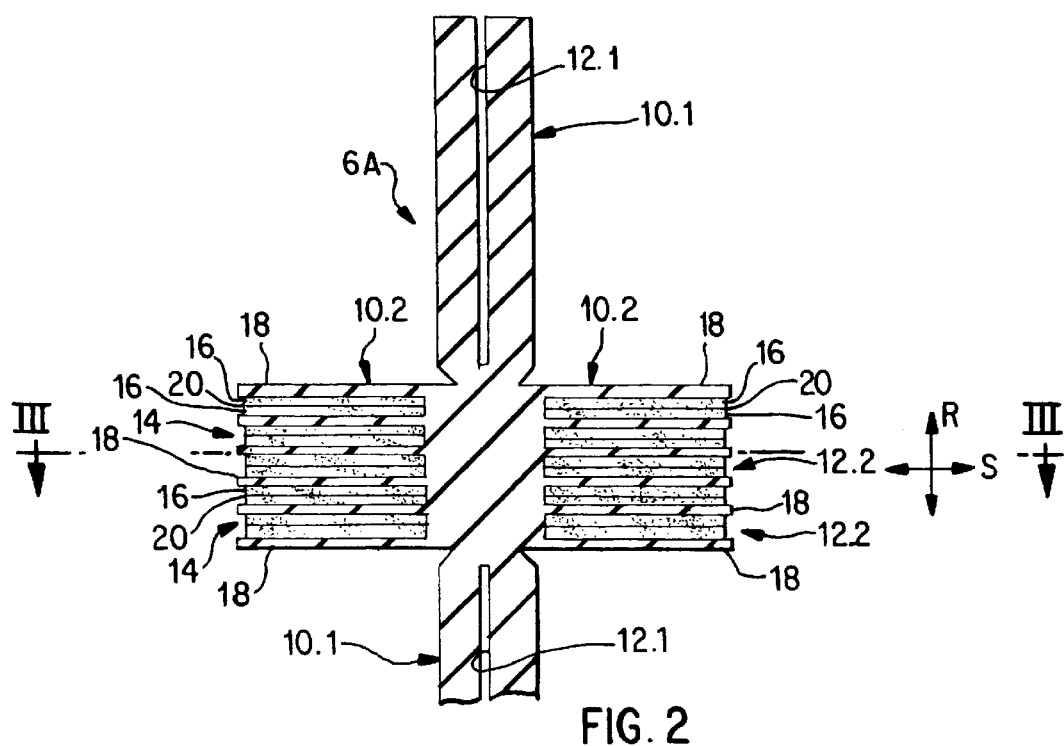
FIG. 2 is an enlarged schematic cross-sectional representation of the lead-lag elastic support beam section of FIG. 1D.

To achieve the required torsional elasticity about the longitudinal axis A of the beam, as shown in FIG. 2, slot-shaped grooves or notches 12.1 and 12.2 are provided in the support arms 10.1 and 10.2 of the beam section 6A, which are arranged in a cross-shape. The grooves 12.2 are o coupled, in a manner explained hereinafter, with an elastomer damping device for the lead-lag bending vibrations of the support beam 6. The notches 12.2 are provided in the form of a plurality of narrow slots approximately 5 to 10 mm wide, which extend parallel to one another in the lead-lag direction S, from the exterior edge of the support arms 10.2 into the interior of the support beam structure.

According to the invention, in each of these slots 12.2, an individual elastomer damper 14 is provided whose elastomer layers 16 are bonded to the adjoining supporting wall section 18 of the beam arms 10.2, as well as to an intermediate layer 20, for example, by vulcanizing, over their whole interface. The intermediate layers 20, which may consist of a fiber reinforced material, are constructed to be so stiff (that is, resistant to shear and tension) in the middle surface of the intermediate layer, that they do not participate in the lead-lag motions (deformation in the plane of rotation) of the support beam 6. (The fiber reinforced material of the intermediate layer may, for example, have a shear modulus in the direction of fiber orientation which is on the order of 4000 N/mm$^2$, while the elastomer layers may have a shear modulus on the order of 1 N/mm$^2$.) The thickness of the elastomer layers 16 is as small as possible but, taking into account the local shear distortions, may be selected to be variable and at least so large that the damping effect is fully maintained for the required useful life. Suitable thicknesses for the elastomer layers 16 are in the range of 2 to 4 mm, while the intermediate layer thickness may be in the range of 1.0 to 1.5 mm.

The relative displacement between the lead-lag deformation of the supporting wall sections 18 and the stiff intermediate layers 20 causes shear deformations in the elastomer layers 16 which are associated with dissipation work. The large aggregate elastomer volumes of all elastomer layers 16 and the extent and homogeneity of the shear deformation result in a high damping performance and, at the same time, the described rotor blade connection meets the requirements concerning torsional and tensile stiffness, as well as bending characteristics.

Figure 3:
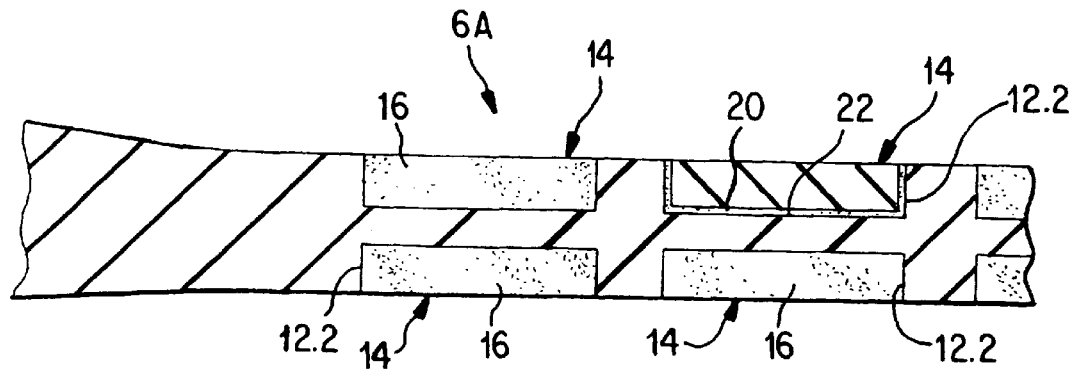
FIG. 3 is a schematic representation of the arrangement of individual dampers distributed in the longitudinal direction of the beam.

FIG. 3 illustrates an embodiment, in which the intermediate layers 20 are fixed by way of a singular fastening point 22 to the support beam structure 6. In addition, in this embodiment, the slots 12.2 and the individual dampers 14 do not extend along the whole length of the lead-lag elastic beam section 6A but, in the longitudinal direction of the beam, are divided into several partial slots or damping segments which are each separated from one another by the core structure of the support beam 6. As a result, sensitive coordination between the damping behavior and the lead-lag motions of the support beam 6 can be achieved.

Figure 4:
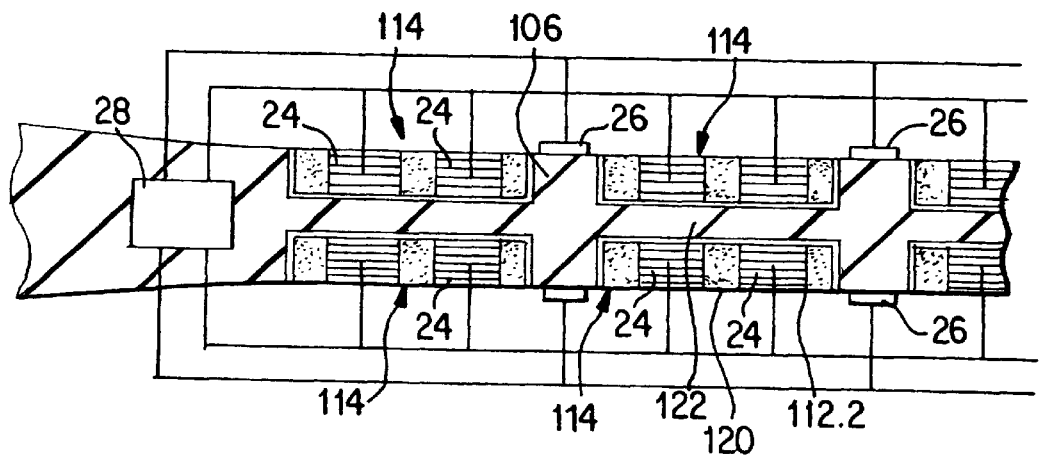
FIG. 4 is a schematic representation corresponding to the representation of FIG. 3 of a rotor blade connection with an electrically controllable damping effect.

In the embodiment of FIG. 4, active and passive lead-lag damping are combined in a slot and damper arrangement which corresponds largely to that according to FIGS. 1 to 3. (Mutually corresponding structural elements are indicated by a reference number increased by 100.) Active lead-lag damping takes place by means of electrically controllable disk-shaped piezo elements 24 which are placed (for example, glued) to the intermediate layers 120 so that the surface dimensions of the intermediate layers 120, and thus the shear distortion distribution of the elastomer layers 116, can be actively influenced by external electric control commands. For automatic control of the piezo-electric disks 24, sensors 26 are arranged on the support beam structure 106 which detect the time-dependent lead-lag bending deformation behavior of the support beam 106 and report it to a central control unit 28. The latter converts the sensor signals according to a given control program or a characteristic data diagram into corresponding control commands for the individual piezo-electric disks 24 which match the inherent lead-lag form of the flex beam 106. In this manner, the damping of the support beam 106 can be improved significantly. Thus, because of the low inherent damping of the rotor especially in the case of helicopters, the active shear deformation is required when the rotor is generating little thrust and the passive damping effect of the individual dampers 114 is small. Otherwise, the structural and functional aspects of the rotor blade connection according to FIG. 4 are the same as in the case of the above-described embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Connection apparatus for a helicopter rotor blade, comprising:

a support beam for connecting a lift-generating wing section of the rotor blade with a rotor hub in a manner which transmits centrifugal and lateral forces as well as bending and torsional moments, said support beam being torsionally and bending elastic; and a device formed on said support beam for damping bending vibrations of the support beam; wherein:

the device for damping bending vibrations comprises a plurality of separate individual dampers;

each individual damper is constructed of alternating elastomer layers and intermediate layers, which intermediate layers are stiff in a middle surface thereof;

said elastomer and intermediate layers are arranged parallel to a main bending plane of the support beam;

the individual dampers are each integrated in the support beam structure in slots extending from an exterior edge thereof into the support beam interior, substantially parallel to one another; and two exterior elastomer layers of each individual damper are bound to adjoining support beam sections.

2. Rotor blade connection according to claim 1 wherein each intermediate layer of the individual dampers is fixed to the support beam structure by a single fastening point.

3. Rotor blade connection according to claim 1 wherein the support beam slots are divided into longitudinally separated partial slots in a longitudinal direction of the beam and an individual damper is arranged in each partial slot.

4. Rotor blade connection according to claim 1 wherein surface dimensions of the intermediate layers can be electrically controlled.

5. Rotor blade connection according to claim 4 wherein the intermediate layers are covered with electrically controlled piezo elements.

6. Rotor blade connection according to claim 5 wherein the support beam has a sensor arrangement, which detects bending vibrations of the support beam, and a control unit which activates the piezo elements according to the sensor signals.

7. Rotor blade connection according to claim 1 wherein individual elastomer dampers are arranged to provide a damping effect in a lead-lag bending direction of the support beam.

8. Rotor blade connection according to claim 1 wherein the support beam and the intermediate layers comprise a fiber reinforced material.

9. Damping arrangement for damping bending vibrations in a support beam which connects a lift generating wing section of a helicopter rotor blade with a rotor hub, said support beam having a plurality of elongated substantially planar slots extending along a longitudinal axis thereof, which slots are arranged in parallel to a rotational plane of said rotor blade, said damping arrangement comprising:

a plurality of substantially planar individual dampers arranged in respective slots of said support beam;

each of said dampers comprising alternating elastomer layers and intermediate layers, said intermediate layers being relatively more resistant to shear and tension in a plane parallel to said plane of rotation than are said elastomer layers; and outermost elastomer layers of said dampers being fixed to adjoining interior surfaces of said slots.

10. A support beam for connecting a lift generating wing section of a helicopter rotor blade with a rotor hub, said support beam comprising:

an elongated support member having a plurality of elongated substantially planar slots extending along a longitudinal axis thereof, which slots are arranged in parallel to a rotational plane of said rotor blade:

a plurality of substantially planar individual dampers arranged in respective slots of said support beam;

each of said dampers comprising alternating elastomer layers and intermediate layers, said intermediate layers being relatively more resistant to shear and tension in a plane parallel to said plane of rotation than are said elastomer layers; and outermost elastomer layers of said dampers being fixed to adjoining interior surfaces of said slots.

* * * * *